: 3,453,241
PREPARATION OF HIGHLY POLYMERIC POLYESTERS IN THE PRESENCE OF ORGANO-TITANIUM CATALYSTS
Lambert Gaston Jeurissen, Mortsel-Antwerp, and André Jan Conix, Antwerp, Belgium, assignors to Gevaert-Agfa N.V., Mortsel, Belgium, a Belgian company
No Drawing. Filed Mar. 10, 1966, Ser. No. 533,240
Claims priority, application Great Britain, Mar. 11, 1965, 10,407/65
Int. Cl. C08g *17/015*
U.S. Cl. 260—75
6 Claims

ABSTRACT OF THE DISCLOSURE

Highly polymeric polyesters are obtained from an aromatic dicarboxylic acid or an ester-forming derivative thereof and a glycol by (I) forming a glycol dicarboxylate from the above-mentioned starting materials, and (II) polycondensing the glycol dicarboxylate in the presence of the titanium compound of the formula $TiR_n$, wherein the R's are the same or different aliphatic, aromatic, or cyclo-aliphatic hydrocarbon radicals, which are bound to the titanium atom through carbon atoms, and $n$ is 2, 3, or 4.

---

The invention relates to improvements in the manufacture of polyesters, in particular highly polymeric polyethylene terephthalate.

Highly polymeric polyethylene terephthalate has great value as fibre and film material. In general it is made by ester-interchange reaction between an ester of terephthalic acid and ethylene glycol whereby bis(beta-hydroxyethyl)-terephthalate is formed. This compound is then polycondensed under reduced pressure and at high temperature.

The prior art contains a large number of disclosures regarding the use of catalysts in the manufacture of fibre and film-forming linear condensation-type polyester. Among numerous useful catalysts for preparing polyesters are zinc acetate, antimony trioxide, titanium compounds such as titanium tetra fluoride, titanium dioxide, alkyl and aryl titanates, titanium tetrachloride, titanium dichloride diacetate and compounds of other metals.

According to the invention an improved process is provided for the manufacture of highly polymeric polyesters, obtained by reacting a glycol with an aromatic dicarboxylic acid or an ester-forming derivative thereof and polycondensing the resulting glycol dicarboxylate, characterized in that at least during the polycondensation step an organometallic titanium compound is present, which is soluble in the reaction mixture and possesses the formula $TiR_n$, wherein the R's represent same or different aliphatic, aromatic or cycloaliphatic hydrocarbon radicals, which are bound to the titanium atom through carbon atoms, and $n$ is 2, 3 or 4. Preferred compounds are where the organometallic titanium compound is polyalkyl titanium or polyaryl titanium.

These organometallic titanium compounds are useful for the catalysis of both ester-interchange and polycondensation reactions.

If preferred, any other ester-interchange catalyst such as zinc acetate, or a mixture of such substances may be used as the ester-interchange catalyst, whilst the organometallic titanium compounds of our invention are used as the polycondensation catalysts. Alternatively the organometallic titanium compounds may be used as catalysts, especially in the polycondensation step, together with other known polycondensation catalysts or mixtures thereof.

An organometallic titanium compound that has been found useful is di(cyclopentadienyl)titanium. According to M. D. Rausch, Can. J. Chem. 41, 1289 (1963), the di(cyclopentadienyl) metal compounds are named metallocenes and hence di(cyclopentadienyl) titanium is named titanocene.

Not only the said titanocene is a very useful catalyst in the manufacture of polyesters, but also titanocene derivatives such as dimethyl titanocene [described at Journal of Inorganic Nuclear Chemistry, 3, (1956) page 104], diphenyl titanocene, di(p-tolyl) titanocene, di(m-tolyl) titanocene [all described at J.A.C.S., 77 (1955) page 3604] and the like. Other useful catalysts are tri(cyclopentadienyl) titanium, tetra(cyclopentadienyl) titanium and titanium compounds of substituted cyclopentadienes such as di(methylcyclopentadienyl) dimethyltitanium.

The organometallic titanium compounds of the invention embrace also polyalkyltitanium compounds, wherein the substituents on the titanium atom can be the same or different, such as tetraethyltitanium [U.S. Patent No. 3,053,871 abstracted at Chem. Abstracts, (1963) page 12602], ethyltributyltitanium, diethyldibutyltitanium and tetrapropyltitanium.

A further class of suitable organometallic titanium compounds are polyaryltitanium compounds, wherein the substituents on the titanium atom can also be the same or different, such as diphenyltitanium and tetraphenyltitanium [described at Chem. Abstracts, (1963) page 8774].

The use of the organometallic titanium compounds as catalysts in the preparation of high molecular weight linear polyesters presents various improvements in comparison to the catalysts proposed in the prior art. During heating of the reaction mixture the organometallic titanium compounds split off carbohydrate, which are inert in the reaction, cannot be taken up in the growing polymeric chain and give no rise to colour reactions or side-chain reactions. Moreover, these split off carbohydrates can easily be eliminated during the reaction. Thus results in polyesters of high molecular weights and high melting points.

Very small amounts of organometallic titanium compounds according to the invention suffice to effectively catalyse the ester-interchange and/or the polycondensation reaction. These small amounts constitute a further improvement over the prior art. Indeed, the colouration of the polyesters in general is proportional to the total amount of catalyst added and since with the present organometallic titanium catalysts a very small quantity as indicated suffices, polyesters of less colouration are obtained.

The known antimony catalysts in general give polyesters with relatively low melting points. Further their catalytic action is relatively slow. The organometallic titanium compounds of the present invention, however, are much more active in catalyzing the ester-interchange and/or polycondensation, and at the same time give polyesters with much higher melting points indicating a low diethylene glycol content, and resulting in a higher modulus of elasticity of the films manufactured from the polyesters obtained.

Although the description and statements of the invention have especially interest in view of the use of the novel catalysts in the preparation of polyethylene terephthalate, the organometallic titanium compounds can, in general, be employed in the preparation of all polyesters involving an ester-interchange reaction with another dicarboxylic acid ester, for instance a pyridine dicarboxylic acid ester, or mixtures of different dicarboxylic acid esters and a glycol, mixtures of glycols, or other diols, such as cyclohexane dimethanols, followed by polycondensation of the resulting glycol and/or diol dicarboxylates.

The organometallic titanium compounds do not interfere with stabilizing agents such as those phosphates or phosphites that are known to be added to the polycondensation reaction.

The following examples are cited to illustrate the invention. They are not intended to limit it in any way. In these example, the intrinsic viscosity $[\eta]$, which is a measure of the degree of polycondensation, is determined as follows.

$$[\eta] = \lim_{c \to 0} \frac{\eta_{inh.}}{c}$$

$\eta_{inh}$ = the inherent viscosity
$c$ = the concentration.

The inherent viscosity $\eta_{inh}$ is determined at 25° C., at a concentration of 0.5 gram per 100 millilitres in a 60:40 mixture of phenol and sym.-tetrachloroethane. $\eta_{inh}$ is calculated from the equation $$\eta_{inh.} = \frac{\ln \eta_{rel.}}{c}$$

wherein $\eta_{rel}$ is the relative viscosity and $$\eta_{rel.} = \frac{\text{flow time of solution}}{\text{flow time of solvent}}$$

and $c$ is the concentration (0.5).

The crystalline melting point is determined by heating a crystallized sample of polyester on the heating stage of a polarizing microscope. The temperature of the hot stage is raised at a rate of 0.8° C./min. The crystalline melting point is obtained by noting the temperature at which between crossed nicols the last trace of birefringence disappears.

At the end of the polycondensation period the colour of the molten polyester is visually compared with arbitrary colour standards consisting of aqueous solutions of Du Pont Pontamine Catechu 3G dye (C.I. 36,300) according to the following system of colour ratings:

0 = pure water
1 = 0.00025 gram of the above dye dissolved in 100 ml. of water
2 = twice as much dye as in 1
3 = three times as much dye as in 1
4 = four times as much dye as in 1
5 = etc.

Example 1

38.8 parts of dimethyl terephthalate (0.2 mole) and 27.3 parts of ethylene glycol (0.44 mole) are placed in a 25 mm. inside diameter glass polymerization tube, and 13.3 mg. of diphenyl titanocene ($2.10^{-4}$ mole/mole of dimethyl terephthalate) are added. Diphenyltitanocene has been prepared according to the method described in J. Am. Chem. Soc. 77, 3604 (1955). The reactants are heated for 2½ hr. at 197° C. at atmospheric pressure. A continuous stream of dry nitrogen is introduced through a capillary tube reaching to the bottom of the reaction tube. The ester-interchange being finished, the temperature is gradually raised over 30 min. to 282° C. and the unreacted ethylene glycol distilled off. The pressure is reduced to 0.1 to 0.3 mm. of Hg, while dry nitrogen is bubbled through the melt. After only 2 hours at 282° C., vacuum is released and polyethylene terephthalate polyester is obtained having an intrinsic viscosity $[\eta] = 0.69$ dl./g. The polyester is clear, has a colour number of 9, and melts at 265.5° C., which indicates a very low diethylene glycol content.

Example 2

The process of Example 1 is repeated, after having replaced, however, the 13.3 mg. of diphenyltitanocene by 6.7 mg. or $1.10^{-4}$ mole/mole of dimethyl terephthalate. The intrinsic viscosity $[\eta]$ of the polyethylene terephthalate obtained is 0.63 dl./g. The polyester is clear, has a low colour number of 7 and melts at 266° C., which indicates a low diethylene glycol content.

Example 3

The process of Example 1 is repeated with the sole difference that 3.4 mg. of diphenyltitanocene or $5.10^{-5}$ mole/mole of dimethyl terephthalate is used. The polyester obtained has an intrinsic viscosity $[\eta]$ of 0.60 dl./g., is clear, has a low colour number of 5, and melts at 268° C., which indicates a very low diethylene glycol content.

Example 4

38.8 parts of dimethyl terephthalate (0.2 mole) and 27.3 parts of ethylene glycol (0.44 mole) are placed in a 25 mm. inside diameter glass polymerization tube, and 7.1 mg. of titanocene ($2.10^{-4}$ mole/mole of dimethyl terephthalate) are added. Titanocene is produced according to the method described in J. Inorg. Nucl. Chem. 2, 149 (1956). The reactants are heated for 2½ h. at 197° C. at atmospheric pressure. A continuous stream of dry nitrogen is introduced through a capillary tube reaching to the bottom of the reaction tube. The ester-interchange being finished, the temperature is gradually raised over 30 min. to 282° C. and the unreacted ethylene glycol distilled off. The pressure is reduced to 0.1 to 0.3 mm. of Hg, while dry nitrogen is bubbled through the melt. After only 2 h. at 282° C., vacuum is released and polyethylene terephthalate polyester is obtained having an intrinsic viscosity $[\eta] = 0.66$ dl./g. The polyester is clear and has a colour number of 8.

Example 5

38.8 parts of dimethyl terephthalate (0.2 mole) and 27.3 parts of ethylene glycol (0.44 mole) are placed in a 25 mm. inside diameter glass polymerization tube, and 7.1 mg. of tetrapropyltitanium ($2.10^{-4}$ mole/mole of dimethyl terephthalate) are added. The reactants are heated for 2½ h. at 197° C. at atmospheric pressure. A continuous stream of dry nitrogen is introduced through a capillary tube reaching to the bottom of the reaction tube. The ester-interchange being finished, the temperature is gradually raised over 30 min. to 282° C. and the unreacted ethylene glycol distilled off. The pressure is reduced to 0.1 to 0.3 mm. of Hg, while dry nitrogen is bubbled through the melt. After only 2 h. at 282° C., vacuum is released and polyethylene terephthalate polyester is obtained having an intrinsic viscosity $[\eta] = 0.60$ dl./g. The polyester is clear and has a low colour number of 6.

Example 6

38.8 parts of dimethyl terephthalate (0.2 mole) and 27.3 parts of ethylene glycol (0.44 mole) are placed in a 25 mm. inside diameter glass polymerization tube, and 14.2 mg. of tetraphenyltitanium ($2.10^{-4}$ mole/mole of dimethyl terephthalate) are added. Tetraphenyltitanium was prepared according to the method described in Dokl. Akad. Nauk SSSR 150 (3), 566–9 (1963) (Chem. Abstr. 59, 8774h (1963)). The reactants are heated for 2½ h. at 197° C. at atmospheric pressure. A continuous stream of dry nitrogen is introduced through a capillary tube reaching to the bottom of the reaction tube. The ester-interchange being finished, the temperature is gradually raised over 30 min. to 282° C. and the unreacted ethylene glycol distilled off. The pressure is reduced to 0.1 to 0.3 mm. of Hg, while dry nitrogen is bubbled through the melt. After only 2 h. at 282° C., vacuum is released and polyethylene terephthalate polyester is obtained having an intrinsic viscosity $[\eta] = 0.62$ dl./g. The polyester is clear and has a low colour number of 7.

Example 7

388 parts of dimethyl terephthalate (2 mole) and 275 parts of ethylene glycol (4.4 mole) are placed in a stainless steel autoclave equipped with a stirrer, a gas inlet tube and a rectifying column. After having added 50 mg. of diphenyltitanocene, the mixture is stirred and heated for 3 h. at 197° C. at atmospheric pressure. A continuous stream of dry nitrogen is introduced through the gas inlet tube. The ester-interchange being finished, the temperature is gradually raised over 1 h. to 282° C. and the unreacted ethylene glycol distilled off. The pressure is reduced to 0.01 to 0.3 mm. of Hg. After 3 h. at 282° C., vacuum is released and polyethylene terephthalate polyester is obtained having an intrinsic viscosity $[\eta]=0.63$ dl./g. The polyester is clear and has a light colour number of 6.

Example 8

38.8 parts of dimethyl terephthalate (0.2 mole) and 27.3 parts of ethylene glycol (0.44 mole) are placed in a 25 millimeter inside diameter glass polymerization tube, whereupon 1.3 mg. of diphenyltitanocene ($2.10^{-5}$ mole/mole of dimethyl terephthalate) together with 1.7 mg. of zinc di(monomethyl terephthalate) ($2.10^{-5}$ mole/mole of dimethyl terephthalate) are added. The reactants are heated for 4 h. at 197° C. at atmospheric pressure. A continuous stream of dry nitrogen is introduced through a capillary tube reaching to the bottom of the reaction tube. The ester-interchange being finished, the temperature is gradually raised over 30 min. to 282° C. and the unreacted ethylene glycol distilled off. The pressure is reduced to 0.1 to 0.3 millimeter of mercury, while the reaction mixture is stirred under dry nitrogen. After 4 h. at 282° C., vacuum is released and polyethylene terephthalate polyester is obtained having an inherent viscosity of 0.67. The polyester is clear and has a light colour number 5.

Example 9

38.8 parts of dimethyl terephthalate (0.2 mole) and 27.3 parts of ethylene glycol (0.44 mole) are placed in a 25 millimeter inside diameter glass polymerization tube, and whereupon 1.3 mg. of diphenyltitanocene ($2.10^{-5}$ mole/mole of dimethyl terephthalate) together with 1.7 mg. of zinc di(monomethyl terephthalate) ($2.10^{-5}$ mole/mole of dimethyl terephthalate) are added. The reactants are heated for 4 hours at 197° C. at atmospheric pressure. A continuous stream of dry nitrogen is introduced through a capillary tube reaching to the bottom of the reaction tube. The ester-interchange being finished, the temperature is gradually raised over 30 min. to 282° C. and the unreacted ethylene glycol distilled off. Then 2.6 mg. of triphenyl phosphate ($4.10^{-5}$ mole/mole of dimethyl terephthalate is added as stabilizer. The pressure is reduced to 0.1 to 0.3 millimeter of mercury while the reaction mixture is stirred under dry nitrogen. After 4 h. at 282° C., vacuum is released and polyethylene terephthalate polyester is obtained having a viscosity 0.70. The polyester is clear and has a light colour number 4.

What we claim is:

1. In a process for the manufacture of highly polymeric film-forming polyesters in which (I) a glycol is reacted with a compound selected from the group consisting of an aromatic, dicarboxylic acid and an ester-forming derivative thereof and (II) the resulting glycol dicarboxylate is condensed to form the polyester, the improvement comprising the use in catalytic amounts at least during the polycondensation step of a titanium catalyst selected from the group consisting of dialkyl di(cyclopentadienyl) titanium, di(cyclopentadienyl) titanium, diaryl di(cyclopentadienyl) titanium, tetraalkyl titanium, and diaryl titanium.

2. A process according to claim 1 in which the glycol is ethylene glycol.

3. A process according to claim 1 in which the aromatic dicarboxylic acid is terephthalic acid.

4. A process according to claim 1 in which ester-interchange occurs between ethylene glycol and dimethyl terephthalate to form bis(2-hydroxy ethyl) terephthalate.

5. A process according to claim 1 in which the organometallic titanium compound is di(cyclopentadienyl) titanium.

6. A process according to claim 1 in which the titanium catalyst is present in proportions of from about $2.10^{-5}$ mole to $2.10^{-4}$ mole per mole of the dicarboxylic acid or ester-forming derivative thereof employed in forming the glycol dicarboxylate.

References Cited

UNITED STATES PATENTS

| 2,727,881 | 12/1955 | Caldwell et al. | 260—75 |
| 3,021,349 | 2/1962 | Du Butts | 260—429.5 |
| 3,047,515 | 7/1962 | Piirma | 260—75 |
| 3,326,965 | 6/1967 | Schultheis et al. | 260—475 |

WILLIAM H. SHORT, Primary Examiner.

L. P. QUAST, Assistant Examiner.

U.S. Cl. X.R.

260—295, 429.5, 45.7, 475, 485